United States Patent [19]

Norling

[11] Patent Number: 4,912,990

[45] Date of Patent: Apr. 3, 1990

[54] MAGNETICALLY DRIVEN VIBRATING BEAM FORCE TRANSDUCER

[75] Inventor: Brian L. Norling, Mill Creek, Wash.

[73] Assignee: Sundstrand Data Control, Inc., Redmond, Wash.

[21] Appl. No.: 315,964

[22] Filed: Feb. 27, 1989

[51] Int. Cl.$^4$ ................................................ G01L 1/10
[52] U.S. Cl. .............................. 73/862.59; 73/DIG. 1
[58] Field of Search ............. 73/862.59, 517 AV, 704, 73/778, 651, DIG. 1

[56] References Cited

U.S. PATENT DOCUMENTS

| | | | |
|---|---|---|---|
| 2,854,581 | 9/1958 | Scarrott | 73/517 AV X |
| 3,190,129 | 6/1965 | Kritz et al. | 73/517 AV |
| 3,529,470 | 9/1970 | Agar | 73/862.59 |
| 4,215,570 | 8/1980 | EerNisse . | |
| 4,372,173 | 2/1983 | EerNisse et al. . | |
| 4,467,651 | 8/1984 | Peters et al. . | |

FOREIGN PATENT DOCUMENTS 2162314  1/1986  United Kingdom ............. 73/862.59

Primary Examiner—Charles A. Ruehl
Attorney, Agent, or Firm—Michael S. Yatsko; Trevor B. Joike

[57] ABSTRACT

A vibrating beam force transducer that can be realized in a silicon micromachined device such as a micromachined accelerometer. The transducer includes a beam having a longitudinal axis, and a drive circuit electrically coupled to the beam for causing the beam to oscillate at a resonant frequency that is a function of a force applied along the longitudinal beam axis. The drive circuit provides an electrical current to the beam, and the beam, or a conductive portion thereof, conducts the current along a path that includes an axial component parallel to the longitudinal axis. A magnetic field is created intersecting the axial component, such that the electric current interacts with the magnetic field to produce a force that causes the beam to oscillate at the resonant frequency. In a preferred embodiment, the transducer has a double ended tuning fork configuration, and the current path extends along one beam and back along the other beam.

11 Claims, 5 Drawing Sheets

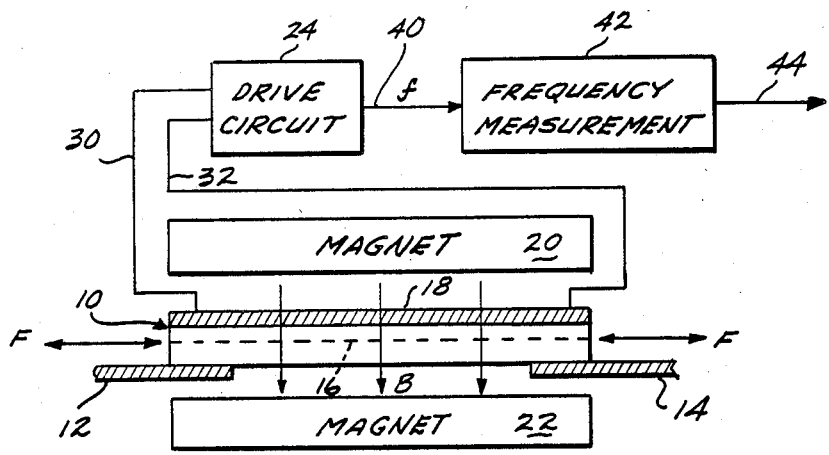
Fig. 1.
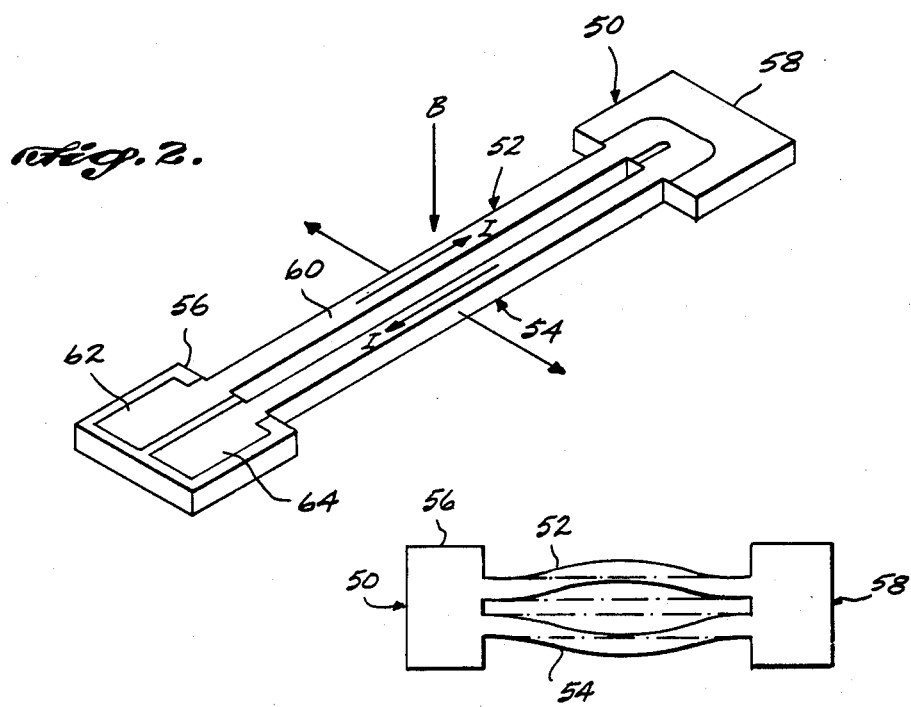
Fig. 2.
Fig. 3.

4,912,990

MAGNETICALLY DRIVEN VIBRATING BEAM FORCE TRANSDUCER

FIELD OF THE INVENTION

The present invention relates to force transducers and, in particular, to a force transducer in which an applied force changes the vibration frequency of a vibrating beam.

BACKGROUND OF THE INVENTION

Vibrating beam force transducers are often used as force-to-frequency converters in accelerometers, pressure sensors and related instruments. In one well-known design, described in U.S. Pat. No. 4,372,173, the force transducer is in the form of a double-ended tuning fork fabricated from crystalline quartz. The transducer comprises a pair of side-by-side beams that are connected to common mounting structures at their ends. Electrodes are deposited on the beams in predetermined patterns, and the electrodes are connected to a drive circuit. The drive circuit provides a periodic voltage that causes the beams to vibrate toward and away from one another, 180° out of phase. In effect, the drive circuit and beams form an oscillator, with the beams playing the role of the frequency control crystal, i.e., a mechanical resonance of the beams controls the oscillation frequency. A tension force applied along the beams increases the resonant oscillation frequency. The frequency of the drive signal is thereby a measure of the force applied axially along the beams.

Vibrating beam force transducers require materials with low internal damping, to achieve high Q values that result in low drive power, low self-heating, and insensitivity to electronic component variations. Transducer materials for high-accuracy instruments also require extreme mechanical stability over extended cycles at high stress levels. One of the key problems in producing such transducers involves the drive and position pick-off measurement. Crystalline quartz is the most commonly used material for mechanical transducers because of its piezoelectric properties, which properties provide the ability to drive and sense mechanical motion through the use of a simple surface electrode pattern.

With the advent of low cost, micromachined mechanical structures fabricated from crystalline silicon, it has become desirable to create silicon vibrating beam transducers. However, silicon does not possess piezoelectric properties for driving and sensing beam vibration. It is therefore desirable to provide a method of exciting and sensing the resonance of a silicon beam, without adding substantial costs, mechanical instabilities, or excessive complexity. One prior approach to this problem has been to apply a piezoelectric material (e.g., zinc oxide) to a silicon beam. This approach can provide the required drive/pick-off capability, but adds complexity, instability, and thermal expansion mismatch, and tends to degrade the reliability of the sensor. Doping and thermal drive techniques can also be used, but they create significant self-heating problems, and do not provide means for sensing beam position.

SUMMARY OF THE INVENTION

The present invention provides a vibrating beam force transducer that can be realized in a silicon micromachined structure. The force transducer is of the type comprising a beam having a longitudinal axis, and drive means electrically coupled to the beam for causing the beam to oscillate at a resonant frequency that is a function of a force applied along the longitudinal axis of the beam. The drive means provides an electric current to the beam, and conduction means physically coupled to the beam receives the current and conducts it along a current path that includes an axial component parallel to the longitudinal axis. Magnetic means are provided for creating a magnetic field that intersects said axial component. The electric current flowing along the current path thereby interacts with the magnetic field, so as to produce a force on the beam that causes the beam to oscillate at the resonant frequency.

In a preferred embodiment, the transducer has the form of a double ended tuning fork, with a transducer body comprising first and second beams having parallel longitudinal axes. For such an embodiment, the current path may extend along the longitudinal axis of one beam in a first direction, and then along the longitudinal axis of the other beam in the opposite direction. When the magnetic field is perpendicular to the plane containing both beams, current flow along the current path causes the beams to oscillate towards and away from one another, 180° out of phase. Single beam transducers that resonate in torsional modes are also described.

BRIEF DESCRIPTION OF THE DRAWINGS

FIG. 1 is a schematic view illustrating the force transducer of the present invention;

FIG. 2 is a first preferred embodiment of a transducer body.

FIG. 3 is a top plan view schematically illustrating a preferred resonant mode for the transducer of FIG. 2.

DETAILED DESCRIPTION OF THE INVENTION

Figure 4:
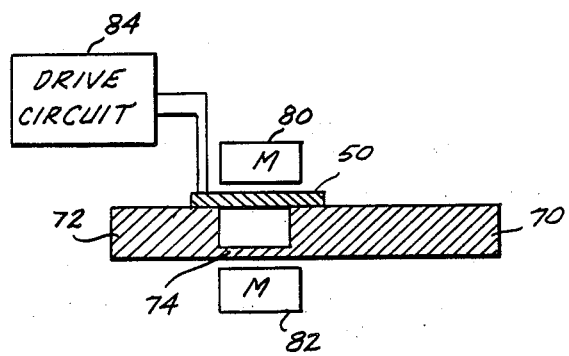
FIG. 4 is a schematic view illustrating the used of a force transducer in a micromachined accelerometer.

FIG. 1 schematically illustrates a force transducer according to the present invention. The transducer comprises beam 10, magnets 20 and 22, and drive circuit 24. Beam 10 is connected between structures 12 and 14 along longitudinal axis 16 and includes an electrically conductive region 18 that extends generally parallel to axis 16. Structures 12 and 14 exert a tension or compression force F on beam 10. Magnets 20 and 22 produce a magnetic field B that passes through beam 10, and in particular through conductive region 18, in a direction generally normal to axis 16.

Drive circuit 24 is connected to conductive region 18 by lines 30 and 32, and causes a periodic current to flow through the conductive region. Flow of current along region 18 interacts with magnetic field B, to produce a periodic force on beam 10. In the arrangement shown in FIG. 1, this force is directed into and out of the plane of the drawing, thereby causing beam 10 to oscillate along such direction. The drive circuit, in combination with beam 10, forms an electrical oscillator that oscillates at a frequency determined by the mechanical resonance of the beam. The frequency of such resonance in turn depends upon the axial force F exerted on the beam by structures 12 and 14. The drive circuit thereby produces an output signal on line 40 at a frequency f that is a function of axial force F. Frequency measurement circuit 42 measures the frequency of this signal, to produce an output signal on line 44 that provides a measure of force F.

In the arrangement shown in FIG. 1, drive circuit 24 provides two functions. First, the drive circuit provides the electrical energy that causes current to travel along path 18. Second, the drive circuit frequency locks to the mechanical resonance of beam 10, so that the drive circuit also provides a pick off means for determining the oscillation frequency. It will be appreciated that separate drive and pick off circuits could be employed, with each circuit having a separate conductive path 18 along the beam longitudinal axis. However, the single circuit embodiment shown in FIG. 1 is simpler, and will be generally preferred. If a separate sensing circuit is used, movement of the beam in the magnetic field will produce a current that is proportional to beam velocity. This velocity signal can be integrated to provide position information to the sensing circuit, which information may then be provided to the drive circuit which controls the phase and amplitude of a drive current to sustain resonance.

A preferred embodiment of the transducer of the present invention is shown in FIG. 2. The illustrated transducer includes body 50 having the overall form of a double-ended tuning fork, the body including parallel beams 52 and 54 interconnected at their ends by mounting pads 56 and 58. A conductive (e.g., metallic) trace 60 is deposited on the upper surface of body 50, and extends from a first contact 62 on mounting pad 56, along beam 52 to mounting pad 58, and then back along beam 54 to a second contact 64 also on mounting pad 56. Contacts 62 and 64 are in turn connected to the drive circuit. A magnetic field B is generated in a direction perpendicular to beams 52 and 54 and to the plane in which body 50 is formed. As a result, a current I passing through trace 60 from contact 62 to contact 64, in the direction indicated by the arrows in FIG. 2, produces outwardly directed forces on the two beams. When the current flow direction is reversed, inwardly directed forces are produced. As a result, the beams can be made to oscillate in the triplanar symmetric mode shown in FIG. 3. In this mode, the beams vibrate towards and away from one another, 180° out of phase. This mode of oscillation is preferred, because it tends to cause cancellation of the stresses coupled into mounting pads 56 and 58, thereby minimizing the amount of mechanical energy transmitted through the mounting pads into the structures to which the mounting pads are attached.

FIG. 4 schematically illustrates the use of a transducer of the type shown in FIG. 2 in an accelerometer. The accelerometer includes proof mass 70 connected to support 72 by flexure 74, and transducer body 50 extending between the proof mass and support in a direction generally parallel to the flexure. Magnets 80 and 82 produce a magnetic field normal to the axis of body 50, and the body is connected to drive circuit 84 that provides periodic current flow through the transducer beams. In this application, the transducer shown in FIG. 2 has the advantage that both of the electrical contacts of the transducer are positioned on the same mounting pad, so that an electrical connection to the proof mass 70 is unnecessary.

An accelerometer of the type shown in FIG. 4 can be readily fabricated by means of known silicon micromachining techniques. For example, one could commence with a wafer of P-type silicon having N-doped epitaxial layers on both surfaces. The epitaxial layer on the upper surface could be etched to form transducer body 50, while the epitaxial layer on the lower surface was etched to form flexure 74, in both cases using an electrochemical etch stop. Alternatively, transducer body 50 could lie in the plane of the upper surfaces of proof mass 70 and support 72, with the transducer body again being formed from an N-doped epitaxial layer.

Figure 5:
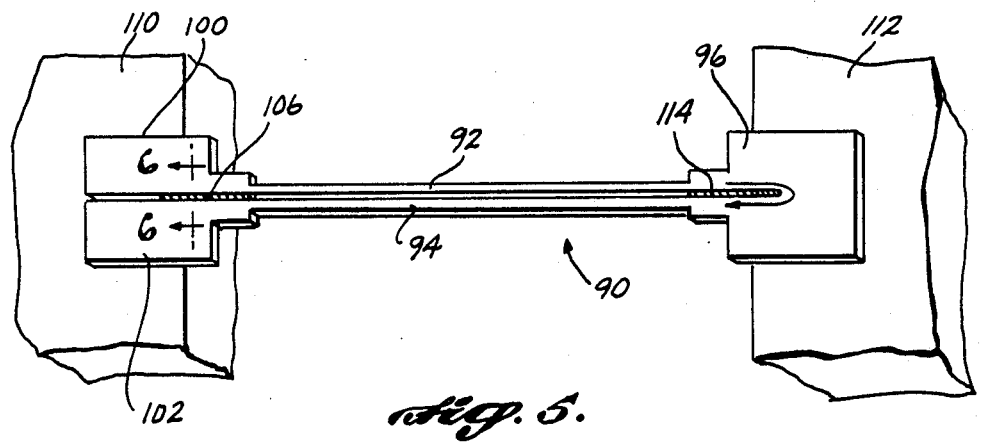
FIG. 5 is a perspective view of a second preferred embodiment of the transducer body.

The transducers described above all include conductive regions or traces within the transducer beam or beams. FIG. 5 illustrates an embodiment in which the entire beams conduct the current provided by the drive circuit. This embodiment includes body 90 comprising beams 92 and 94 that are connected to common mounting pad 96 at one end, and that form a pair of separating mounting pads 100 and 102 at their opposite ends. Body 90 is constructed from a conductive material, such as conductive silicon, silicon dioxide, silicon nitride, silicon epitaxy, etc. Structures 110 and 112 comprise a nonconductive material, such as nonconductive bulk silicon. Mounting pads 100 and 102 are connected to structure 110, which could for example comprise a support in an accelerometer, and mounting pad 96 is connected to structure 112, which could for example comprise a proof mass in an accelerometer. Mounting pads 100 and 102 comprise the electrical contacts for connection to the drive circuit.

Figure 6:
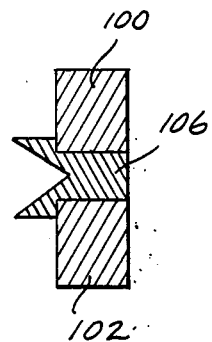
FIG. 6 is a cross-sectional view taken along line 6—6 of FIG. 5.

A nonconductive filler 106 is positioned between a portion of mounting pads 100 and 102, to provide mechanical beam-to-beam coupling without permitting electrical current to flow therebetween. Filler 106 could comprise an oppositely doped material that formed a diode junction with transducer body 90. The shape of filler 106, shown in FIG. 6, represents a geometry achievable within process limitations of micromachined silicon. Optionally, a second nonconductive filler 114 may be positioned between beams 92 and 94 at mounting pad 96, to provide mechanical symmetry. The additional mechanical coupling between the beams that is provided by the fillers helps ensure that both beams resonate at the same frequency. The symmetry provided by filler 114 is important for dynamic balance to minimize energy loss to the surrounding structure. Fillers 106 and 114 overlie respective structures 110 and 112 to a degree sufficient to make both ends appear elastic or identical with respect to beam coupling, despite their functional dissimilarity.

Figure 7:
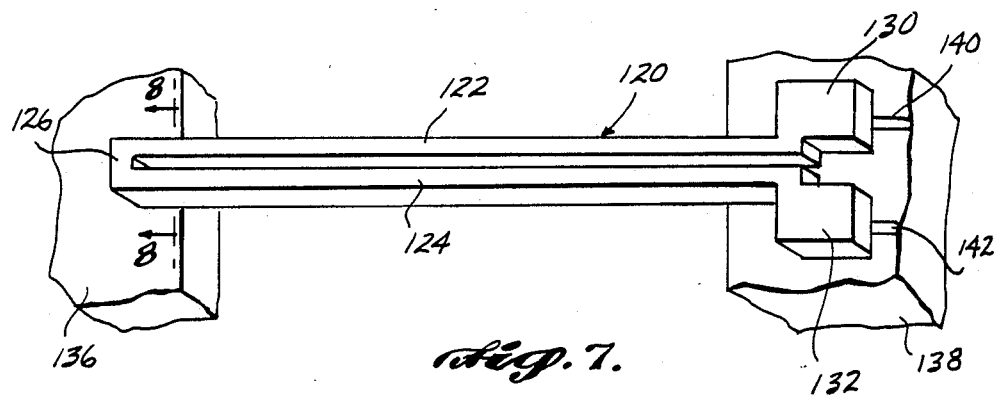
FIG. 7 is a perspective view showing a third preferred embodiment of the transducer body.
Figure 8:
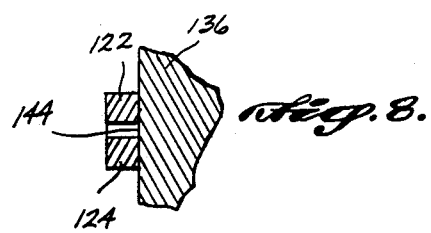
FIG. 8 is a cross-sectional view taken along the line 8—8 of FIG. 7.

FIGS. 7 and 8 illustrate a further embodiment of the invention. In this embodiment, the transducer comprises a conductive body 120 that includes beams 122 and 124, U-shaped section 126, and electrical contacts 130 and 132. Section 126 connects one end of body 120 to a first mounting structure 136, while contacts 130 and 132 connect the other end of the body to a second mounting structure 138. Contacts 130 and 132 may in turn be connected to a suitable drive circuit by traces 140 and 142 on mounting structure 138.

For the embodiment shown in FIGS. 7 and 8, beam-to-beam coupling is accomplished through the underlying structures at each end of the body. For example at structure 136, the portion of the structure identified by reference numeral 144 provides the necessary mechanical coupling between the beams. This approach is imperfect, because the elastic foundation is misaligned with the beam motion, which includes a couple in the beams. This creates a beam motion which is not purely linear, a slight superimposed rotation that induces some out-of-plane motion. Nevertheless, this arrangement is suitable for many purposes. Moreover, the rotation can be eliminated by means of a filler material between the beams at the mounting structures. The filler could be doped oppositely to the beams, to maintain electrical isolation.

Figure 10:
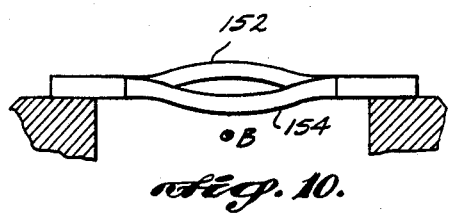
FIG. 10 is a side elevational view, schematically illustrating a resonant vibration mode for the transducer body of FIG. 9.
Figure 9:
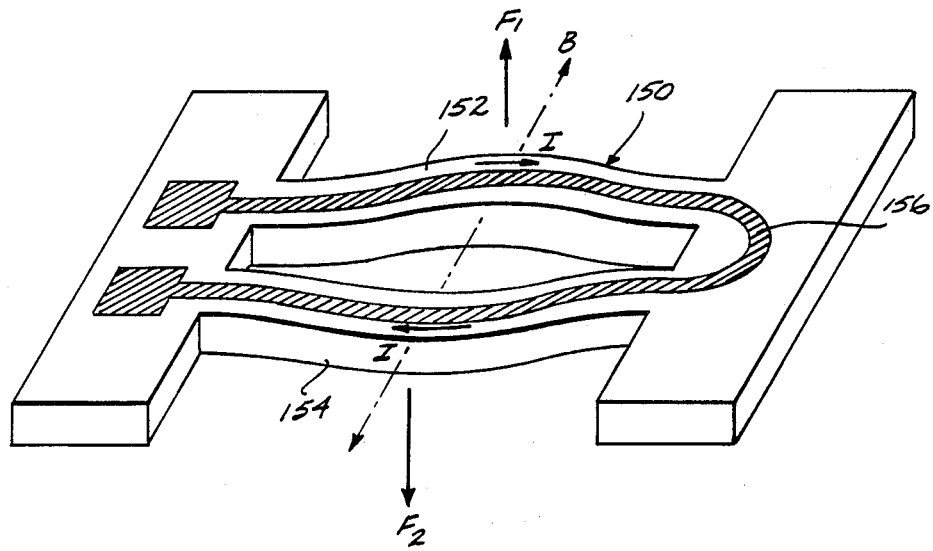
FIG. 9 is a perspective view schematically illustrating a fourth preferred embodiment of the transducer body.

FIGS. 9 and 10 illustrate a transducer that is driven in an out-of-plane resonant mode. This transducer includes a body 150 that has the same overall configuration as body 50 shown in FIG. 2. However, for the embodiment of FIGS. 9 and 10, the magnetic field B lies in the plane of the transducer body, normal to beams 152 and 154. As a result, a given current flow through trace 156 produces an upward force $F_1$ on one beam, and a downward force $F_2$ on the other beam, producing vibration in the resonant mode illustrated in FIG. 10. The type of resonance shown in FIG. 10 lacks the perfect cancellation of dynamic stresses inherent in the triplanar symmetric mode shown in FIG. 3, but is nevertheless useful where thin, flat, and/or low frequency force transducers are required.

Figure 11:
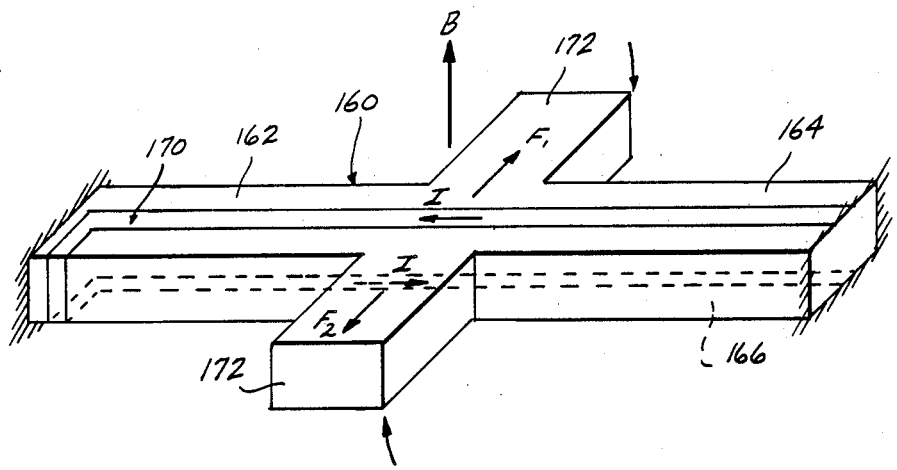
FIG. 11 is a perspective view of a first torsional embodiment of the transducer body.

FIG. 11 illustrates a torsional embodiment of the invention. The force transducer shown in FIG. 11 includes a body 160 that comprises a single beam 162 that includes upper surface 164 and lower surface 166. A single conductive trace 170 extends along the length of beam 162 on upper surface 164, then crosses to lower surface 166, and extends back along the length of the beam. With the magnetic field B oriented as illustrated, normal to the plane of body 160, current flowing through trace 170 produces forces $F_1$ and $F_2$ that combine to produce a torque about the beam longitudinal axis. Body 160 may include arms 172 to increase the moment of inertia of the body. The transducer shown in FIG. 11 can be made with a conductive pattern on only one side of the beam. However, for such an arrangement, the magnetic field must have a significant vector component in the plane of the transducer, perpendicular to the beam longitudinal axis. The arrangement shown in FIG. 11, wherein current is carried in opposite directions along opposite sides of the beam, serves to cancel linear forces due to misalignment of the magnetic field, a feature that helps minimize coupling to undesired nonrotational resonant modes.

Figure 12:
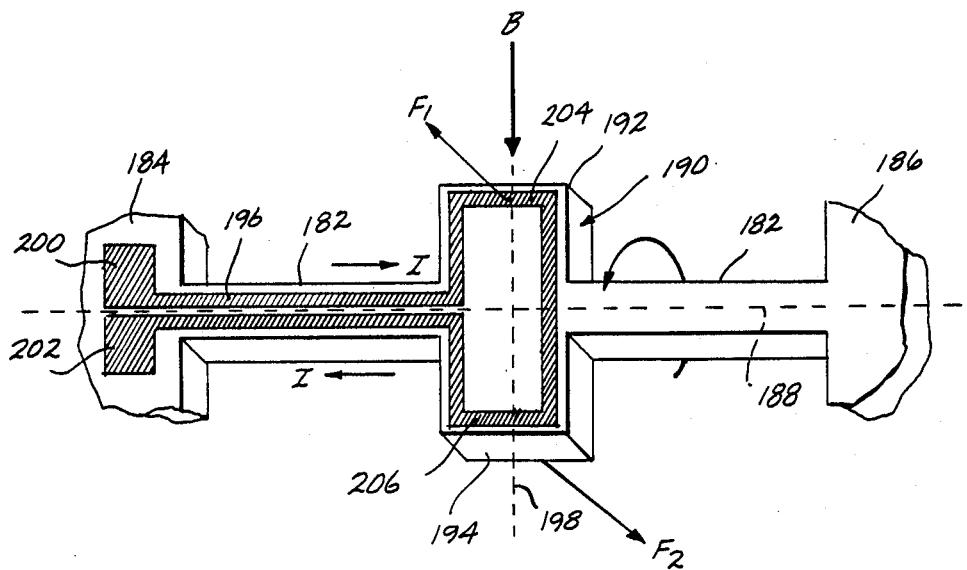
FIG. 12 is a perspective view of a second torsional embodiment of the transducer body.

FIG. 12 illustrates a second torsional embodiment of the invention. The transducer of FIG. 12 includes beam 182 that extends between mounting structures 184 and 186 along longitudinal axis 188. The central portion of beam 182 comprises enlarged portion 190 that includes arms 192 and 194 extending in opposite directions from the beam along cross axis 198. Conductive trace 196 extends from a first contact pad 200 on structure 184, along beam 182 to central portion 190, around the central portion as indicated, and then back along beam 182 to second contact pad 202, also on structure 184. With the magnetic field B oriented as illustrated, parallel to cross axis 198, the indicated current flow in trace 196, and in particular in portions 204 and 206 of trace 196, produces oppositely directed forces $F_1$ $F_2$ that result in a torsional force around beam longitudinal axis 188, as in the embodiment of FIG. 11.

The magnetic fields required for practice of the present invention can be generated by a variety of means, including permanent magnets, current loops, and the earth's magnetic field. For all cases, the driving force on each vibrating beam will be proportional to the magnitude of the magnetic field. Changes in the orientation of the magnetic field vector will also influence drive force magnitude in the desired direction. Since the gain required of the drive circuit will be directly affected by the strength of the magnetic field, it is desirable to maintain a constant magnetic field vector. Thus, a high magnetic flux level is desirable, so that changes induced by the earth's field, and magnetic noise, have a small effect on the drive level. Current levels in the conductor can also be small, to minimize power consumption, voltage requirements, and self-heating. For certain embodiments, it may be advantageous to use a current loop in addition to a permanent magnet, to control the drive level.

Figure 13:
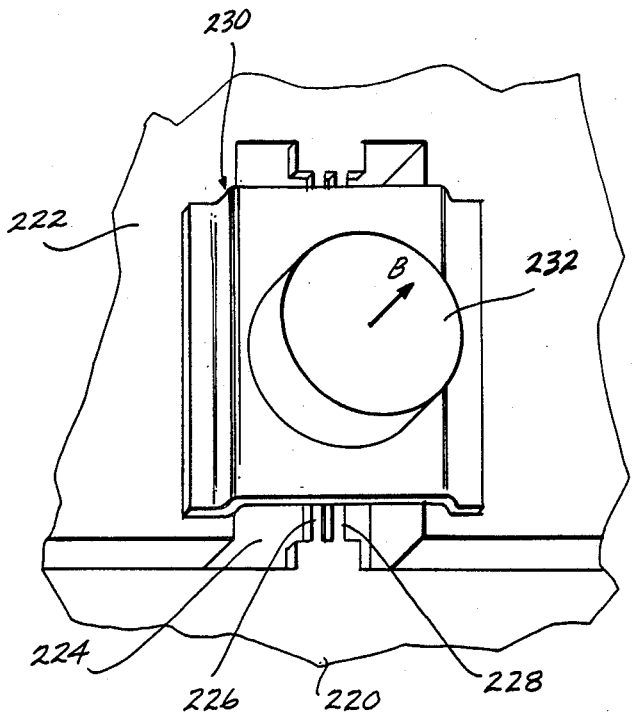
FIG. 13 is a perspective view showing a mounting technique for a magnet.

In the production of a micromachined device, such as a micromachined accelerometer, it may be desirable to deposit a permanent magnet directly on the silicon wafer. An example of such a structure is shown in FIG. 13. A portion of an accelerometer is shown, including proof mass 220 connected to support 222 by suitable flexure means (not shown). Support 222 includes a cutout section 224, through which force transducer beams 226 and 228 extend between proof mass 220 and support 222. Bridge member 230 is secured to support 222, and extends over beams 226 and 228. The bridge member mounts a magnet 232, such that the magnet is positioned directly over the beams, and produces a magnetic field normal to the beam longitudinal axes.

Figure 14:
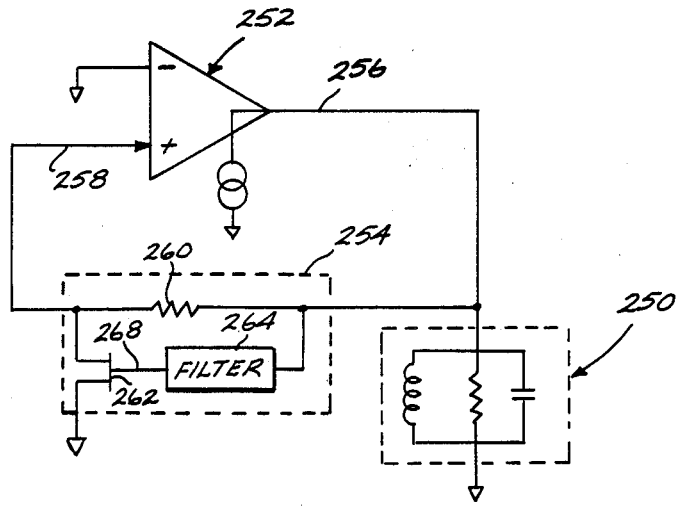
FIG. 14 is a circuit diagram of the drive circuit.

FIG. 14 illustrates a suitable drive circuit for the transducer of the present invention. For transducers of the type described, the beam or beams oscillating in the magnetic field can be modeled as an inductor, resistor and capacitor connected in parallel, as illustrated by mechanical resonator element 250. The circuit for driving such a device comprises transconductance amplifier 252 and gain control circuit 254, connected to element 250 in a positive feedback loop. Transconductance amplifier 252 produces an output current on line 256 that is proportional to the voltage of an input signal connected to the noninverting input terminal of the amplifier on line 258. Gain control circuit 254 comprises fixed resistor 260, variable resistor (FET) 262, and filter 264. Filter 264 filters the AC drive signal on line 256, to produce a slowly varying signal on line 268 proportional to the drive signal magnitude. The signal on line 268 is used as a control signal to vary the resistance of FET 262, to thereby vary the magnitude of the feedback signal provided on line 258.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. In a vibrating beam force transducer, of the type comprising first and second beams having respective first and second longitudinal axes that are parallel to one another and drive means electrically coupled to the beams for causing the beams to oscillate at a resonant frequency that is a function of a force applied along the longitudinal axes, the improvement wherein the drive means provides an electrical current to the beams, and wherein the transducer comprises conduction means physically coupled to the beams for receiving the electrical current and conducting the electrical current along a current path that includes first and second axial components parallel to the first and second longitudinal axes, the first axial component being opposite in direction to the second axial component, and magnetic means for creating a magnetic field that intersects said axial components, whereby the electrical current flowing along said current path interacts with the magnetic field so as to produce forces on the beams that cause the beams to oscillate at said resonant frequency.

2. The improvement of claim 1, wherein the magnetic field is perpendicular to a plane containing both beams, whereby the beams oscillate towards and away from one another, 180° out of phase.

3. The improvement of claim 1, wherein the magnetic field lies in a plane containing both beams, whereby the beams oscillate out of said plane.

4. The improvement of claim 1, wherein the beams comprise nonconductive silicon, and wherein the conduction means comprises a conductive region formed in the silicon.

5. The improvement of claim 1, wherein the beams comprise a conductive, silicon based material, whereby the beams also form the conduction means.

6. In a vibrating beam force transducer, of the type comprising a beam having a longitudinal axis and drive means electrically coupled to the beam for causing the beam to oscillate at a resonant frequency that is a function of a force applied along the longitudinal axis, the improvement wherein the drive means provides an electrical current to the beam, and wherein the transducer comprises conduction means physically coupled to the beam for receiving the electrical current and conducting the electrical current along a current path that includes a first axial component extending in a first longitudinal direction parallel to the longitudinal axis and spaced from the longitudinal axis in a first transverse direction normal to the longitudinal axis, and a second axial component extending in a second longitudinal direction parallel to the longitudinal axis and spaced from the longitudinal axis in a second transverse direction parallel to the first transverse direction, the first and second longitudinal directions being opposite to one another, and the first and second transverse directions being opposite to one another, and magnetic means for creating a magnetic field that intersects said axial components, whereby the electric current flowing along the current path interacts with the magnetic field so as to produce a torque on the beam that causes the beam to oscillate torsionally at said resonant frequency.

7. The improvement of claim 6, wherein the beam comprises a cross member extending laterally from the beam in a direction normal to the longitudinal axis.

8. The improvement of claim 7, wherein the beam comprises a first end, wherein the conduction means comprises a conductive trace extending from said first end to the cross member and from the cross member back to the first end.

9. The improvement of claim 6, wherein the beam comprises first and second surfaces positioned on opposite sides of the longitudinal axis from one another, and wherein the conduction means comprises a conductive trace that extends along the first surface from the first end of the beam to adjacent the second end of the beam, then crosses to the second surface, and then extends back to the first end of the beam along the second surface.

10. In a vibrating beam force transducer, of the type comprising a body having a double-ended tuning fork construction, the body including first and second beams that are mutually parallel to one another, the first and second beams extending between first and second mounting pads, the beams having respective first and second longitudinal axes that are parallel to one another, the transducer further comprising drive means electrically coupled to the beams for causing the beams to oscillate at a resonant frequency that is a function of a force applied along the longitudinal axes, the improvement wherein the drive means provides an electrical current to the beams, and wherein the transducer comprises conduction means physically coupled to the beams for receiving the electrical current and conducting the electrical current along a current path that includes first and second axial components parallel to the first and second longitudinal axes, and magnetic means for creating a magnetic field that intersects said axial components, whereby the electrical current flowing along said current path interacts with the magnetic field so as to produce forces on the beams that cause the beams to oscillate at said resonant frequence, the current path extending from the first mounting pad along the first beam to the second mounting pad, and then along the second beam back to the first mounting pad.

11. The improvement of claim 10, wherein the transducer further comprises a nonconductive filler material positioned between the beams to physically couple the beams to one another.

* * * * *